United States Patent [19]

Tomecek et al.

[11] 3,981,544
[45] Sept. 21, 1976

[54] BRAKE CONTROLLER AND SHORT CIRCUIT PROBE DISCONNECT

[75] Inventors: Jerry J. Tomecek, Milford; Philip J. Hagerty, Marshall, both of Mich.

[73] Assignee: Tekonsha Engineering Company, Tekonsha, Mich.

[22] Filed: Feb. 2, 1976

[21] Appl. No.: 654,466

Related U.S. Application Data

[62] Division of Ser. No. 531,171, Dec. 9, 1974.

[52] U.S. Cl............................ 303/21 AF; 340/53; 340/253 A
[51] Int. Cl.² ................... B60T 17/22; B60Q 11/00
[58] Field of Search ...... 303/21 AF; 340/53, 253 R, 340/253 A, 255, 409; 307/92, 94; 317/60 R, 60 A; 318/563, 565; 324/51

[56] References Cited
UNITED STATES PATENTS

| | | | |
|---|---|---|---|
| 3,544,844 | 12/1970 | Pellegrino | 340/253 A |
| 3,906,476 | 9/1975 | Yonezu | 340/253 R |

*Primary Examiner*—Trygve M. Blix
*Assistant Examiner*—Reinhard J. Eisenzopf
*Attorney, Agent, or Firm*—Miller, Morriss and Pappas

[57] ABSTRACT

A control for brakes in trailer vehicles comprising a circuit providing pulsed signals to the brakes. It is preferred that the time or width of each pulse is equal but the frequency of brake pulsing is increased in accord with inertially sensed stress. The frequency of the signal is directly related to the movement of a dampened cantilever beam which normally blocks the passage of light to a light sensitive target or monitor but wherein the passage of light increases and is attenuated by the beam as the beam moves, under inertial imbalance, to permit added light to be sensed. In addition, the control circuit, vulnerable to short circuits in the vehicle circuit from control element to brakes, is continuously monitored by a disconnect element which senses the existence of the short circuit and accomplishes a disabling of current through the control circuit at a threshold to avoid injury to the control circuit. An electromagnetic coil surrounding a reed switch accomplishes the circuit disconnect in a manner timed by a capacitance in the reed switch line. The probe disconnect timed pulse acts on an indicator visible, audible or tactile to the user of such controls and this intermittent signal indicates the presence of a short circuit requiring correction before the normal operation of the control system can be restored.

7 Claims, 6 Drawing Figures

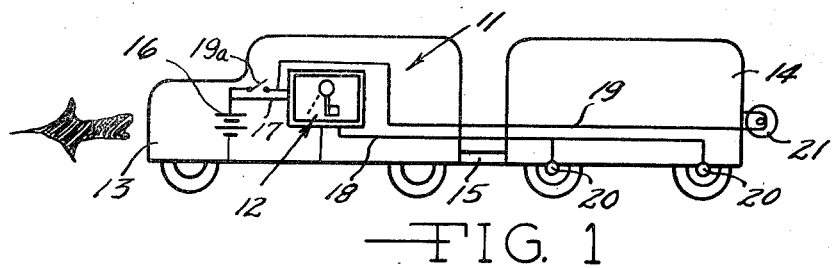
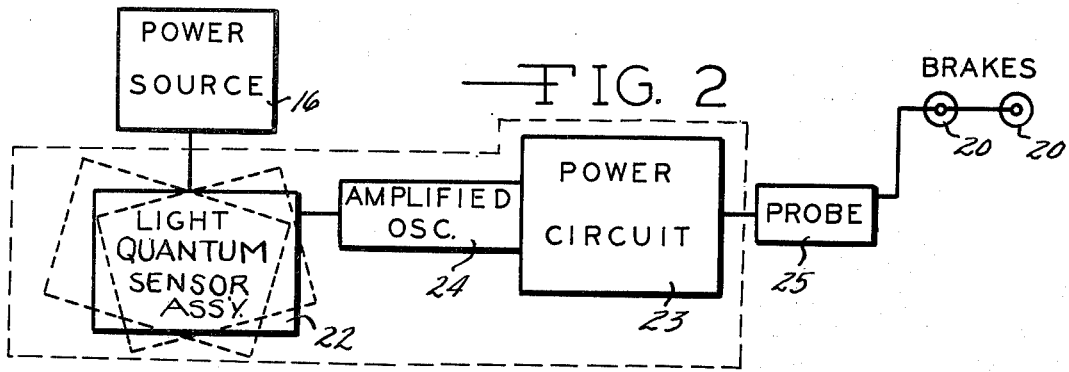
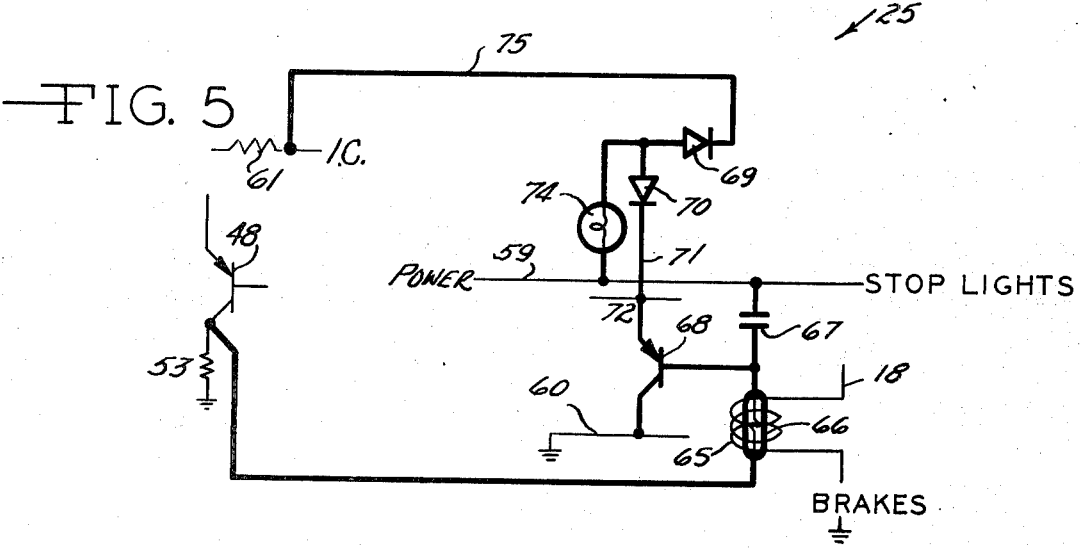

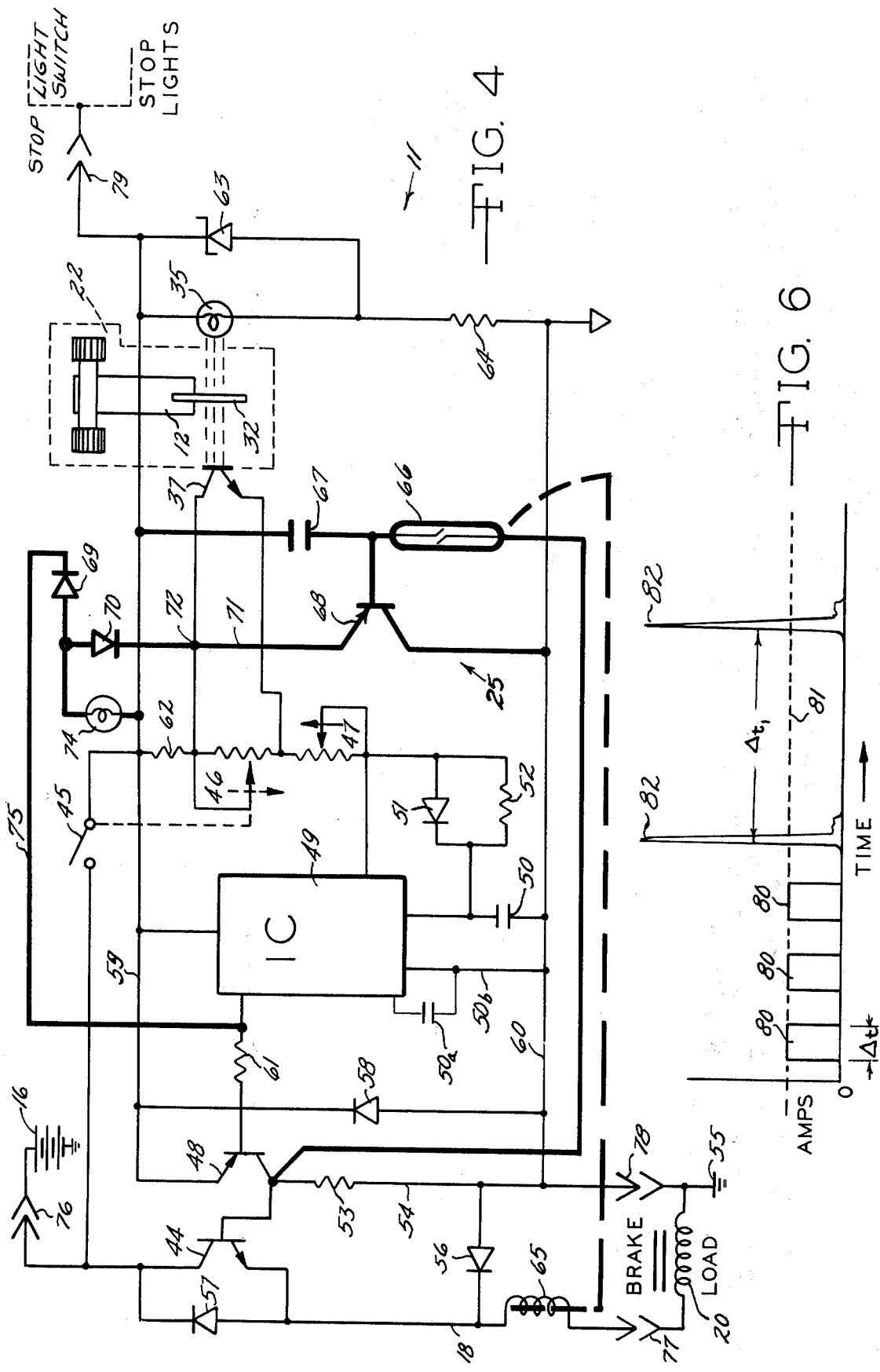

BRAKE CONTROLLER AND SHORT CIRCUIT PROBE DISCONNECT

This is a division of application Ser. No. 531,171, filed Dec. 9, 1974.

The present invention is directed to a new, simplified and improved inertially actuated control structure for brakes on trailer vehicles, and especially electric brakes. The present invention also contemplates a disconnect safety probe which operates concurrently with the brake control unit so that any short circuit outside of the control circuit is sensed; the control circuit is disabled; and the presence of the short circuit is signalled to the driver or user. On restoration of the circuit as by correction of the short circuit, the signal indicates proper operation and the control circuit is restored. The control structure may be positioned in the towing vehicle and operative from the ignition and generator battery system thereof, or it may be located in the trailer or towed vehicle. In the latter instances, a direct current power source is connected to the control structure as extended from the towing vehicle or separately provided as by a battery located in the trailer.

BACKGROUND

In a very general way, the present invention is a substantial improvement over the Towed Vehicle Electric Brake Control as filed on July 27, 1974 by Rene E. Pittet, et al in the U.S. Pat. application Ser. No. 385,102, now U.S. Pat. No. 3,909,075. The object in the present application is to provide an electronic switching structure which senses deceleration or inertial imbalance; translates the imbalance quantitatively to a pulsed signal of regular width and variable frequency useable at the brakes; and provides a continuously operable short circuit probe preventing injury to the control by reason of external short circuits.

The closest art considered in the preparation of this application by the applicants is represented in the U.S. Pat. No. 3,779,612 to Hans Tschannen which describes an unpulsed brake control structure; U.S. Pat. No. 3,497,266 of Kenneth F. Umpleby directed to an override pulsed system, manually actuated in a multivibrator circuit; U.S. Pat. No. 3,499,689 to Ralph W. Carp, et al which senses wheel deceleration and adjusts air brake response in avoidance of skidding; U.S. Pat. No. 2,032,177 to John W. Logan comprising a fluid pressure brake control using a pendulum - like deceleration sensor physically closing a switch structure; and U.S. Pat. No. 3,486,799 to Herbert Greentree in which proportional deceleration is imparted to the trailer brakes and in which there is a dampened inertial sensor.

The present invention distinguishes over these references in providing a simplified electronic control circuit; a cantilever type dampened beam inertial sensor including a light quantum sensor adjustably calibrated; a constant light source with beam interrupted light emission; and a continuously operative short circuit probe in protection of the control circuit. The probe circuit assures an added safety dimension to users. Further, the use of a constant width variable frequency pulse is believed to assure better trailer braking without danger of lock-up of the brakes as occurs in systems which increase the length of each pulse as is known in the prior art.

Accordingly, the principal object is to provide an improved and safer simplified brake control at lower cost using a simple light emitter such as a bulb as a light source and a light sensitive element and wherein a simple dampened cantilever beam gates the light to the light sensitive transistor on inertial displacement of the beam.

Another object is to utilize a relatively simple power transistor as contrasted to earlier brake controls using complex and expensive Darlington transistors for power conduction, for example.

Another object is to provide a continuous and probing disconnect which senses external short circuits or amperage surges beyond the brake operational threshold and intermittently disables the control until the short circuit is eliminated. Then the control circuit is automatically restored. This probe includes a signal, as for example, a visible light flashing.

Still another object is to improve the brake control by utilizing and generating a brake pulse of constant width but varying frequency.

Other objects including gain adjustment and sensitivity adjustment by tilting the cantilever element will become better understood as the description proceeds.

GENERAL DESCRIPTION

In general, an enclosure is provided which contains the inertially sensitive apparatus, the light sensing and signal amplifying and oscillating equipment, wherein the gain is adjustable with manual override; the means to adjust gravitational sensitivity is provided; and wherein the lighting of a signal light indicates the functional character of the hook-up. The control element is connected to a source of electrical power having sufficient amperage to actuate electrical brakes or solenoids for actuating pneumatic or hydraulic responses for braking, for example. The controller is also connected to the trailer brakes. A probe circuit is superimposed on the control circuit and continuously monitors the current conditions to the brakes, and circuitry external to the control circuit. In the probe circuit, a surge of amperage over the normal brake requirements and characterizing a high amperage demand (as occurs with a short circuit) closes a disconnect reed switch timed by suitable capacitance. Closure of the reed switch disables the power to operate the brake circuits and restores the operation when power demand normalizes. If the overload persists, then so long as it persists the probe tests at timed intervals for exploration and discovery of the existing defect. The consequent time interval results in a series of spaced power spikes, each having rapid decay so that the components are not destroyed or damaged.

The controller may be located in the towing or towed vehicle and positioned so that inertially sensitive light interrupting opportunity is displaceable upon deceleration of the vehicles. In the preferred embodiment the controller is operationally activated upon application of the brakes in the towing vehicle so that the brake signal energizes the system. As will be seen, acceleration will not activate the trailer brakes. A light source is continuously operated when the controller is operating. A light sensitive element is located in the path of projected light and that path is interrupted by a barrier formed as a part or extension of a cantilever beam. As braking occurs, varying the inertia to the beam, the beam is deflected proportional to the degree of inertial imbalance and the light can reach the target of the light sensitive element in amounts depending on the displacement. The more displacement (as by a sudden stop) the greater the light and the greater the signal from the photosensitive emitter. The cantilever beam is dampened in avoidance of reactance to normal vibrational activity.

The variable signal is amplified and pulsed to exercise control over the power circuit leading to the brakes in the towed vehicle. In this manner a pulsing of the braking power occurs in which each pulse has an equal width but the frequency of the pulses is proportional to the degree of inertial imbalance. The more sudden a stop, for example, the higher the frequency of the pulsing. This signal utilization simplifies the electronics and as an effective braking pulse the resulting action of the brakes results in smoother assist stopping in the towed vehicle with minimum skidding potential and minimum chance for locking of the brakes as is characteristic in systems which merely increase brake pressure.

In the present invention the sensitivity or operation threshold of the cantilevered beam is adjustable by manually varying the rest position of the cantilever beam support structure and gain or threshold level of power is adjustable by a manually operable element. A separate control attached to a manual control lever and switch provides a manual override function independent of the performance of the cantilever beam.

A probe circuit monitors the pulsed performance to external circuitry as for example to the brakes and apparatus incidental thereto. In the event of a sudden amperage surge, above the operational threshold of the braking pulses, the probe circuit provides a timed frequency disconnect at a frequency which disarms or disables the short circuit from damage or destruction to the control circuit and simultaneously signals (as by visible signal) that a short circuit is present. This interrupts power flow to the load until the short circuit is corrected. Thereupon, the control is automatically operationally restored and power flows. The control as described provides improved braking performance; is proof against destruction by external short circuitry; and brings simplified wiring safety and lower cost to towed vehicle brake controllers. The efficiency of this controller is believed to be higher than previously known units and the minimum heat generating characteristics allow resin cases and supports.

THE DRAWINGS

FIG. 1 is a schematic elevational representation of a towing and towed vehicle and in which the present invention is located in the towing vehicle with its dampened cantilever beam displaceable in the direction of normal forward movement of the vehicles and exercising control to the brakes of the towed vehicle.

FIG. 2 is a schematized diagram of the present invention and indicating its operational aspects in control of the brakes in the towed vehicle.

FIG. 3 is a somewhat stylized perspective cut-away view of the dampened cantilever beam in its movable housing and indicating the direction of deflection of the cantilever beam to allow light to strike a photosensitive element.

FIG. 4 is a circuit diagram indicating the control circuit as contained in a space of less than one inch by four inches by five inches with leads to power connection, brakes, lights and ground and schematically indicating the light interrupting position of the dampened cantilever beam and the encasement, not shown, may be of resin construction.

FIG. 5 is a circuit diagram extracting the probe elements from the circuit as seen in FIG. 4 to reveal its operational simplicity and the light lines indicating the points of integration with the power circuit.

FIG. 6 is a graph of the pulsed signal at a fixed amperage level for braking the towed vehicle and as influenced by a short circuit manipulated by the probe to relieve the control circuit in prevention of damage or destruction. The graph is of time versus amperage or load but is undimensioned in order to represent the pulsing and probe signal disconnect.

SPECIFIC DESCRIPTION

In FIG. 1 the controller 11, containing a dampened cantilever beam element 12, is mounted in a vehicle 13 which vehicle 13 is shown as towing the trailer 14. The vehicles 13 and 14 are connected at the hitch connection 15. The controller 11 is connected to a source of power shown as the battery 16 by a power lead 17 and output lead 18 runs to the brakes 20. The lead 19 extends from power source 16 via a brake switch 19a to the stoplights 21 and the operation of brake switch 19a.

The arrow shows the normal forward direction of the vehicles 13 and 14 and the hidden edge line indicates that the cantilever beam 12 deflects under inertial imbalance in the path of motion of the vehicle and in the normal forward direction of motion. As will be seen, the beam 12 can be varied in position to adjust the threshold of light transmission.

Referring to FIG. 2, the controller 11 houses the sensor assembly 22 containing the cantilever beam 12, a light source and a light sensing element; an amplifier and oscillator circuit 24; and power circuit 23. The tilting of the sensor 22 is represented as a sensitivity adjustment of the controller 11 upon installation and this is schematically represented by the hidden edge lines. The signal generated by the light sensitive element in the light quantum sensor 22 is amplified and oscillated in suitable circuits to pulse the power circuit 23. The amplification and oscillating means 24 are a part of the total controller 11. A probe circuit 25 is superimposed in the control of the power circuit 23 and monitors the condition in the load circuits or external connections beyond the controller 11 as represented in the brakes as schematically shown. The controller 11 is seen connected to the power source 16 such as a direct current source as a battery.

In FIG. 3 the dampened cantilever beam 12 is shown in its housing 26. The beam 12 is comprised of a laminate of sheets 27 and 28 of beryllium copper forming a sandwich with an intermediate layer of thin viscous elastomeric material 29. The lower end of the beam 12 is weighted and jacketed, the weight 30 being clamped onto the beam 12 by the jacket 31 which includes a tailpiece 32 which acts as a shutter. In one direction the beam 12 cannot deflect because it rests against the buttress 33 in the housing 26 as an integral part of the housing 26. The sheets 27 and 28 forming the beam 12 are splayed, as shown, at the top and this supports the beam 12 in a slot 34 formed in the housing 26. The beam 12 is capable of dampened deflection forwardly in the direction of the arrow and as indicated by the broken line. As the beam 12 deflects the shutter element 32 moves also. When the shutter element or tailpiece 32 moves, as under the influence of inertia, a light source 35 mounted in the housing 26 can see into the window 36 and register its rays on the photosensitive monitor element 37 socketed in a suitable aperture in the housing 26. Thus, the action of the shutter 32, under inertial influence, attenuates the light passing from the light source 35 to the light quantum sensor or monitor element 37 considered in the total assembly 22. The light from the source 35 is directionalized by the window 36 toward the target or monitor 37. The housing 26, preferably cast from a durable and suitable resin includes: the base portion 38 which includes the socketing for the bulb 35 and photosensor or monitor 37; the apertures for the shutter 32 and window 36; the shaft extensions 39; and the integral turning knob 40. The knob 40 is serrated peripherally and the serations 41 are impingeable on the spring element 42 engaged against the serrations 41 in resistance to rotation of the knob 40. Since the housing 26 is movable by the coordinate movement of knob 40 the cantilever beam 12 can be caused to separate selectively from the housing back 33 so as to adjust the amount of light and time of light emitted to the target 37. As light passing to the photosensitive element 37 increases beyond a threshold setting, the signal from the photosensitive element 37 increases. The rotation of knob 40 permits the selection of an operational threshold. Trunnion means, not shown, cradle the shaft extensions 39 in the controller 11. Combined, this described grouping is the light sensor assembly 22.

In FIG. 4 the circuit served by the sensor assembly 22 is best understood since the shutter 32 on the beam 12 is in an interruption path between the light source bulb 35 and the (photosensitive) target 37. When inertia causes deflection of the beam 12, as by braking of the towing vehicle, light is transmitted dependent upon the magnitude of inertial imbalance and as will be seen, the light generated signal is amplified and oscillated to create a pulsing of the silicone power transistor 44. The source of power, such as battery 16, is connected to the controller 11 and the power is transmitted in pulses to the load or brakes 20 when light is transmitted by the inertial sensing of the light quantum sensor 22. Actually, a selected load current in this system is fed to the load at all times of operation at a level to allow smooth transition to stop, as will be seen. The controller 11 is activated by manual override, as will be seen, and/or by the actuation of the vehicle stoplight switch outside the controller and designated in phantom line.

A manually operated switch 45 is also a part of the potentiometer 46 so that a manual override is possible by impressing a signal on the circuit independent of the action of the light sensor 22. The potentiometer 47 is a gain (maximum power threshold) adjusting potentiometer. The gate to the power transistor 44 is via the transistor 48. A multiple lead integrated circuit 49 vastly simplifies the circuitry required and the preferred integrated circuit 49 is commercially designated as 555 or equivalent to achieve pulsing to a constant width signal or pulse with variant frequency. The changing capacitor 50 with the diobe 51 and resistance 52 limits the duty cycle and in conjunction with the variable resistances determines the pulse rate of the integrated circuit 49. The low value stabilizing capacitor 50a is located outside of the integrated circuit 49 and is connected thereto on one side and to the base or ground 50b on the other side between the integrated circuit 49 and ground line 60. The capacitor 50a insures positive switching of the integrated circuit 49.

A resistance 53 is positioned in the line 54 to ground 55 to tie down the collector of driving transistor 48 and the base of the power transistor 44 to insure proper operation and also functions as a part of the probe circuit as will be seen. Diode 56 protects, with diode 57 against reverse voltage spikes from the load. The diode 58 is a diode across the control circuit lines 59 and 60 and provides protection against transient voltage for transistor 48 and integrated circuit 49.

The resistance 61 is a current limiting resistor, between the integrated circuit 49 and transistor 48 and acts as a protective resistance as does the resistance 62 between the line 59 and the integrated circuit 49. The Zener element 63 in coordination with the resistance 64 serves voltage to the lamp 35 at a constant level. The resistance 64 is located between the lamp 35 and ground line 60.

In the FIG. 4 the connectors 76, 77, 78, and 79 provide the necessary connections to integrate the controller 11 with, for example, a 12 volt DC current automobile ignition system and electric brakes. The connector 76 links the controller 11 with the power source 16. The connector 77 plugs into the brake load. The connector 78 grounds the controller. The controller 79 shows the control connection to the stoplight switch in a schematic sense because the stoplight switch is operated upon application of the brakes of the towing vehicle 13 and either this action or manual override, as described is needed for automatic control. It will be understood in the circuits as shown in FIGS. 4 and 5 that grounding is to the frame of the vehicle as for example, the chassis as is typical in automotive circuitry.

Referring to FIG. 5, the probe circuit 25 is shown extracted from the controller circuits but better illustrating the coil 65 in the power line 18 to the brakes which magnetically surrounds the reed switch 66. In the FIG. 4 this was shown by the heavy dashed line extending from reed switch 66 to the coil 65.

The power bus 59 is shown at connection to the lamp 74 in the probe circuit 25 and the line 75 bridges to the output of the integrated circuit 49 adjacent to resistance 61.

By reference to FIG. 6, the short circuit probe is best understood. The regular or uniform width brake pulses 80 are shown schematically at a near maximum frequency and delivering an amperage load for the time $\Delta t$ as indicated by the work load amperage level 81, say 15 amps.

When a load in excess of the work load is sensed by the probe circuit 25, then a spike 82 occurs in the pulse form with a rapid almost instantaneous decay from the spike to zero amperage and holds at zero amperage for the time period $\Delta t_1$ as determined by the capacitance 67. This interval (selected at about one second) avoids overheating of the circuit and in tests has protected the control circuit in the controller 11 for extended periods in excess of 68 hours with a short circuit in the load line.

Closure of reed switch 66 takes the junction of capacitor 67 and base of transistor 68 to ground line 60 via resistance 53. Then transistor 68 takes the junction 72 to ground 60 via line 71. This action causes integrated current 49 to cause transistor 48 to cause power transistor 44 to turn off. When power transistor 44 turns off current flow in line 18 is reduced to zero. Then coil 65 no longer having current flow allows the reed switch 66 to open. The transistor 68 starts to dimension conduction at a time dependent upon the charge on capacitance 67. This, in effect, creates a time interval $\Delta t_1$, such that the conduction of transistor 68 is reduced to zero and the integrated circuit 49 causes the transistor 48 to cause power transistor 44 to resume power to the load 20. If amperage requirement is such that the coil 65 is reactivated, then the cycle is repeated providing intermittent spikes having an interval of $\Delta t_1$ as will be seen in FIG. 6. The spikes and interval between spikes is non-detrimental to the system while allowing constant monitoring of the short circuit until the short circuit is removed, whereupon the controller 11 automatically resumes normal operation.

The signalling function of the probe circuit 25 which provides a visual, tactile or audible warning of the bath operation and malfunction as by external short circuits, is also appreciated in the FIG. 4 where the lamp 74 is shown. At the instant that junction 72 is connected to ground 60 through line 71 and transistor 68, current flow from power line 59 through lamp 74 and diode 70 will cause the light 74 to illuminate. As transistor 68 allows less current to flow, the lamp 74 extinguishes. This results in intermittent signalling or flashing of the light 74 as the reed switch 66 opens and closes at the $\Delta t_1$ interval.

During normal operating the lamp 74 is illuminated at an intensity level caused by the pulse rate of the integrated circuit 49 through diode 69. Hence, the illumination is equal to the frequency of the power pulses as influenced by the light sensing inertial structure and the illumination is also influenceable in the same way by manual override.

In operation, the controller 11 of the present invention provides a safer brake control for towed vehicles and in which a pulsed signal activates the brakes in the towed vehicle responsive to the action of a sensitive dampened cantilever beam. The circuits, as described, are extremely simple and amenable to reduced cost and are protected against damage from external defects by a discriminating and continuing probe and circuit disabler. A resin case can be employed. Connectors for circuit integration at power source, load, and ground are reasonably simplified in prevention of errors and if errors in installation are made the controller 11 reacts by applying the brakes fully with the indicator lamp at full strength or by being inoperative or probing and disabled, as described. The full lamp and full braking occurs if the ground is inadequately made. The grounding and cool operation allows the use of a resin housing at substantial cost reduction.

Having thus described our invention and one preferred embodiment thereof in substantial detail others skilled in the art will appreciate modifications, changes and improvements therein and such modifications, changes and improvements are intended to be included herein limited only by the scope of the hereinafter appended claims.

We claim:

1. A brake control for brakes in towed vehicles and connected to a source of electrical energy comprising:
   a light sensitive monitor;
   inertially operated means attenuating light to said monitor;
   a power circuit activated by said light monitor transmitting a pulse at a frequency proportional to the light as determined by said inertially operated means and connected to a source of energy and delivering said thus pulsed energy to brakes in a towed vehicle; and
   a short circuit probe including an electromagnetic reed switch and capacitance timer connected to the power line through said power circuit and sensing amperage surges to provide intermittent disabling of power until said amperage surge is eliminated and in protection of said brake control.

2. In the brake control unit of claim 1 wherein said inertially operated means is an adjustably positioned dampened cantilever beam.

3. A brake control structure in accord with claim 2 wherein said power circuit includes a gain control adjusting the threshold of power to said brakes.

4. A brake control structure in accord with claim 3 and including indicia indicating operative condition of said power circuit and activated intermittently with amperage surges.

5. A brake control for brakes in towed vehicles and connected to a source of electrical energy comprising:
   a directionalized light source;
   a light intensity monitor in the path of said light source;
   an inertially activated adjustably positioned dampened cantilever beam having a path intermediate said light source and said monitor and positionally attenuating light from said light source to said monitor;
   a power circuit activated by said monitor and gated by said monitor in proportion to the amount of light sensed by said monitor;
   a gain control adjusting the gate threshold of said power circuit;
   an indicia designating the operative condition of said power circuit;
   a constant vigil probe circuit including a magnetically operated reed switch and capacitance timer actuated on amperage surge in the load through said power circuit on to external wiring and upon surge intermittently connecting and disconnecting said power circuit and actuating said indicia so long as said amperage surge continues thereby preserving said power circuit from damage.

6. In the combination as set out in the claim 5 and including a manual override whereby from said control independent of said inertial activated dampened cantilever beam said brakes are selectively actuated.

7. A safety probe for external circuits in disabling protection for brake controllers and the like comprising:
   a feed of driving power to a probe circuit from a power source common to said controller;
   an electromagnetic coil in the power line of said controller;
   a reed switch activated by said coil at a load in excess of the normal power requirements;
   a capacitance in the line with said reed switch providing time interval means; and
   a transistor acting as a switch for intermittent probe of said power line at the interval selected by said capacitance and continuing intermittently to restoration of normal load levels.

* * * * *